(12) United States Patent
Hayden et al.

(10) Patent No.: US 10,677,215 B2
(45) Date of Patent: Jun. 9, 2020

(54) WIND TURBINE BLADE AND A METHOD OF MOULDING A WIND TURBINE BLADE TIP SECTION

(71) Applicant: Blade Dynamics Limited, Southampton, Hampshire (GB)

(72) Inventors: Paul Trevor Hayden, Southampton (GB); Harald Behmer, Isle of Wright (GB)

(73) Assignee: Blade Dynamics Limited, Southampton (GB)

( * ) Notice: Subject to any disclaimer, the term of this patent is extended or adjusted under 35 U.S.C. 154(b) by 837 days.

(21) Appl. No.: 15/166,484

(22) Filed: May 27, 2016

(65) Prior Publication Data

US 2016/0348642 A1 Dec. 1, 2016

(30) Foreign Application Priority Data

May 28, 2015 (GB) ...................................... 1509142

(51) Int. Cl.
*F03D 1/06* (2006.01)
*B29D 99/00* (2010.01)
(Continued)

(52) U.S. Cl.
CPC .......... *F03D 1/0675* (2013.01); *B29C 70/342* (2013.01); *B29C 70/345* (2013.01);
(Continued)

(58) Field of Classification Search
CPC . B29C 70/342; B29C 70/345; B29D 99/0028; B29D 70/44; B29L 2031/085;
(Continued)

(56) References Cited

U.S. PATENT DOCUMENTS

2003/0192990 A1 10/2003 Simpson et al.
2006/0188378 A1 8/2006 Bech
(Continued)

FOREIGN PATENT DOCUMENTS

CN 101327654 A 12/2008
CN 202954929 U 5/2013
(Continued)

OTHER PUBLICATIONS

Great Britain Search Report issued in connection with corresponding GB application No. GB1509142.4 dated Nov. 26, 2015.
(Continued)

*Primary Examiner* — David E Sosnowski
*Assistant Examiner* — Sang K Kim
(74) *Attorney, Agent, or Firm* — Dority & Manning, P.A.

(57) ABSTRACT

A wind turbine blade and a method of moulding a wind turbine blade tip section. The overall wind turbine blade has an elongate structure extending in a radial sense in a finished wind turbine. The blade comprises a fairing that one is supported along its length by a spar extended along the full length of the fairing from the root end to the tip. The fairing is in two parts with a main part extending from the root for most the of the longitudinal length of the blade and the tip section forming the remainder of the blade.

9 Claims, 10 Drawing Sheets

(51) Int. Cl.
  *B29C 70/44* (2006.01)
  *B29C 70/34* (2006.01)
  *B29K 75/00* (2006.01)
  *B29L 31/08* (2006.01)

(52) U.S. Cl.
  CPC .......... *B29C 70/44* (2013.01); *B29D 99/0028* (2013.01); *B29K 2075/00* (2013.01); *B29L 2031/085* (2013.01); *F05B 2220/30* (2013.01); *F05B 2230/20* (2013.01); *F05B 2230/50* (2013.01); *F05B 2230/60* (2013.01); *F05B 2240/302* (2013.01); *F05B 2280/6003* (2013.01); *Y02E 10/721* (2013.01); *Y02P 70/523* (2015.11)

(58) Field of Classification Search
  CPC ... B29K 2075/00; F03D 1/0675; F03D 80/30; F05B 2220/30; F05B 2230/20; F05B 2240/302; F05B 2280/6003
  See application file for complete search history.

(56) References Cited

U.S. PATENT DOCUMENTS

| | | | |
|---|---|---|---|
| 2007/0253824 | A1 | 11/2007 | Eyb |
| 2012/0091627 | A1* | 4/2012 | Schibsbye ............ B29C 70/443 264/258 |
| 2012/0213642 | A1 | 8/2012 | Wang et al. |
| 2012/0237356 | A1* | 9/2012 | Mironov ............... B29C 70/342 416/232 |
| 2013/0075025 | A1 | 3/2013 | Guitton |
| 2014/0166208 | A1 | 6/2014 | Schubiger |
| 2014/0334930 | A1 | 11/2014 | Rob |
| 2014/0356182 | A1* | 12/2014 | Obrecht ................ B21D 53/78 416/229 R |
| 2018/0250895 | A1* | 9/2018 | Wardropper ......... B29C 70/345 |
| 2019/0232571 | A1* | 8/2019 | Schibsbye ............ B29C 65/483 |

FOREIGN PATENT DOCUMENTS

| | | | |
|---|---|---|---|
| GB | 2520083 A | 5/2015 | |
| WO | 2009090537 A1 | 7/2009 | |
| WO | 2009130467 | 10/2009 | |
| WO | 2011135306 | 11/2011 | |
| WO | 2012004571 | 1/2012 | |
| WO | WO-2017171704 A1 * | 10/2017 | ............. B29C 70/44 |

OTHER PUBLICATIONS

EP Office Action, dated Mar. 8, 2019.
European Search Report and Written Opinion issued in connection with corresponding EP Application No. 16171157.7 dated Oct. 4, 2016.

* cited by examiner

WIND TURBINE BLADE AND A METHOD OF MOULDING A WIND TURBINE BLADE TIP SECTION

BACKGROUND

Embodiments of the present invention relate to a wind turbine blade and a method of moulding a wind turbine blade tip section.

There is a trend among offshore wind turbine blades for increasing the length of the blade. This is because the power available from a wind turbine blade increases with the square of the radius of the blade. Thus, increasing the radius of the blade produces an increase in power output which is disproportionate to the cost of turbine itself and can contribute to a lower cost of energy.

However, the increase in blade size creates a number of technical challenges.

One of these relates to the tip section of the aerodynamic fairing.

Wind turbine blades have generally been made with fairings which extend for the full length of the wind turbine blade. These are generally made in two half shells which are bonded together on either side of an elongate spar in order to form the completed blade. In order to be able to transport longer blades one proposal is to make the blade in a traditional manner and cut it in half before reassembling it closer to the site of the wind turbine blade. This is a cumbersome process requiring ever larger joints between the cut sections as the blade length increases.

One successful attempt to overcome this problem is to make the blade of a number of modular sections for the spar and fairing which can be assembled closer to the site of the wind turbine. This does not require any blade sections to be cut up and re-joined. It is therefore much more readily scalable.

An example of this is disclosed in our own earlier WO 2009/130467 which has a central modular spar with a number of aerodynamic fairing sections arranged along the windward side and a similar number arranged along the leeward side. These are then connected to the spar and are attached to one another along their radially extending edges. These joints are deliberately offset from being directly at the leading and trailing edges of the aerodynamic fairing to ensure that the joints are kept away from the leading and trailing edges thereby ensuring accurate geometry at both the leading and trailing edges and protecting the joints from wear.

The mass of the blade in the tip region has a disproportionate effect on the blade in terms of the bending moments that it induces on the remainder of the blade. Therefore, it is desirable to have a lightweight tip that reduces loads on the blades and the rest of the turbine.

As the tip is moving faster, any imperfections in the shape of the fairing have a disproportionate effect on the aerodynamic efficiency of the blade and cause increased noise problems. Even greater care is therefore required in the making of the joint in this region.

Further, the longer the blade, the more prone that it is to a lightning strike. While blade tips are provided with openings to allow moisture from condensation to escape, these can often be blocked such that there is a significant amount of moisture which is trapped in the blade tip by the centrifugal forces. When struck by lightning, this liquid vaporises causing a rapid pressure increase in the tip section. This pressure increase can force the tip section apart at the joints between the windward and leeward sides.

BRIEF DESCRIPTION

Embodiments of the present invention address the above problems.

According to a first aspect of the present invention there is provided a wind turbine blade that is at least 50 metres long, the blade having a fairing that comprises a number of sections including a tip section that occupies at least the radially outermost 10% of the aerodynamic fairing, the tip section being a moulded composite component that is moulded as a single piece forming the entire periphery of the tip section on both the leeward and windward sides of the blade.

The inventors have recognised that, in view of the importance of the tip region in its ability to generate power, it makes sense to create this as a precisely moulded lightweight component. This is not as simple to manufacture as the two part shell described above, but pays dividends in terms of its performance.

Thus, the present invention forms at least the outermost 10% of the blade as a single moulded piece. As it is moulded as a single piece, no subsequent joints are required to provide the aerodynamic fairing of the tip. Such a piece is therefore devoid of post-mould joints between adjacent sections e.g. between leading and trailing edge components, or windward and leeward components. Thus, all of the parasitic mass associated with the joints including the significant amount of overlapping material which is needed to provide sufficient rigidity for the joint as well as the adhesive in these regions is eliminated. This allows the tip of the blade to be much lighter thereby significantly reducing the bending moments induced on the rest of the blade by the tip section.

Further, the absence of joints in the blade after moulding reduces any lines of weakness against the sudden pressure increase caused by a lightning strike. The lightning strike does generate a pressure wave along the interior of the blade away from the tip region. However, the peak pressure is quickly reduced as it expands into the large space along the blade such that any regions that are radially inward of the tip section can retain the conventional seam joint between leeward and windward fairing panels without this being a problem in a lightning strike.

The creation of a separate tip section also readily allows the use of high performance materials, if needed, to further enhance the performance of the tip.

It should be noted that it is common in wind turbine blade design to have a plug at the radially outermost tip of the wind turbine blade. This may be a sacrificial component designed with an exposed metal component for lightning protection and bonded with a semi-permanent adhesive. It may also have additional features such as a drainage hole. This plug generally has a radial extent of around half a metre and, for the purposes of the present invention should not be considered to be part of the aerodynamic fairing. In particular, if such a cap is present, it should be ignored when determining the radial extent of the tip section. The tip section occupies just the radially outermost portion of the blade with the remainder of the blade being occupied by a radially inner blade section or sections. In an embodiment, the tip section is confined to the radially outermost 50% (more particularly 30%) of the blade radius.

In an embodiment, the tip section comprises spar caps on the interior face of the fairing one on the windward side and one on the leeward side. These may be adhered in place. However, more particularly, they are co-moulded with the tip section. This again reduces the parasitic mass as no adhesive is required to attach the spar caps. Similarly, one or more shear webs between the spar caps may also be co-moulded with the tip section.

In an embodiment, the spar caps protrude from the tip section. This allows them to be joined to spar caps of the adjacent blade for example using a double scarf joint such as that disclosed in WO 2012/004571.

The blade could be moulded in a single mould having the full shape of the finished tip section. In this case, a mandrel would have to be inserted into the mould and expanded against the composite material during the curing process.

However, an embodiment of the present invention also extends to a method of moulding a wind turbine blade tip section. This forms a second aspect of the invention which is defined as a method of moulding a wind turbine blade tip section that is at least 5 metres long, the method comprising laying up first composite material into a first mould half; laying up second composite material into a second mould half; bringing the mould halves together so that the first and second composite materials overlap where the first and second mould halves meet; and curing the first and second composite materials simultaneously so that the matrices of the first and second composite materials fuse forming seamless joints in the regions where the composite materials overlap.

By laying up the materials in two mould halves, the user has much better access to the mould surfaces thereby allowing the material to be placed in a much more controlled manner. This is therefore much more conducive to more complex moulding where different materials are used in different regions.

More particularly, the method further comprises co-moulding a first spar cap in the first mould half and co-moulding a second spar cap in the second mould half. The spar caps may also protrude from the tip section.

More particularly, at least one pressure bag is inserted into the mould in order to support the composite during the curing process. The method may also comprise co-moulding a shear web between the spar caps. In this case, two pressure bags are may be used, one on either side of the shear web. The pressure bag may be an internal pressure bag but is more particularly a vacuum bag.

In an embodiment, the method comprises providing at least one of the mould halves with an extension that supports overlap material, the method comprising laying up overlap material across the extension, the overlap material being continuous with the material in the rest of the mould half, supporting the overlap material with a pressure bag, and removing the extension before the step of bringing the mould halves together so that the overlap material fuses with the material of the material in the other mould half during the curing process.

BRIEF DESCRIPTION OF THE DRAWINGS

An example of a wind turbine blade and method in accordance with the present invention will now be described with reference to the accompanying drawings, in which.

DETAILED DESCRIPTION

Figure 1A:
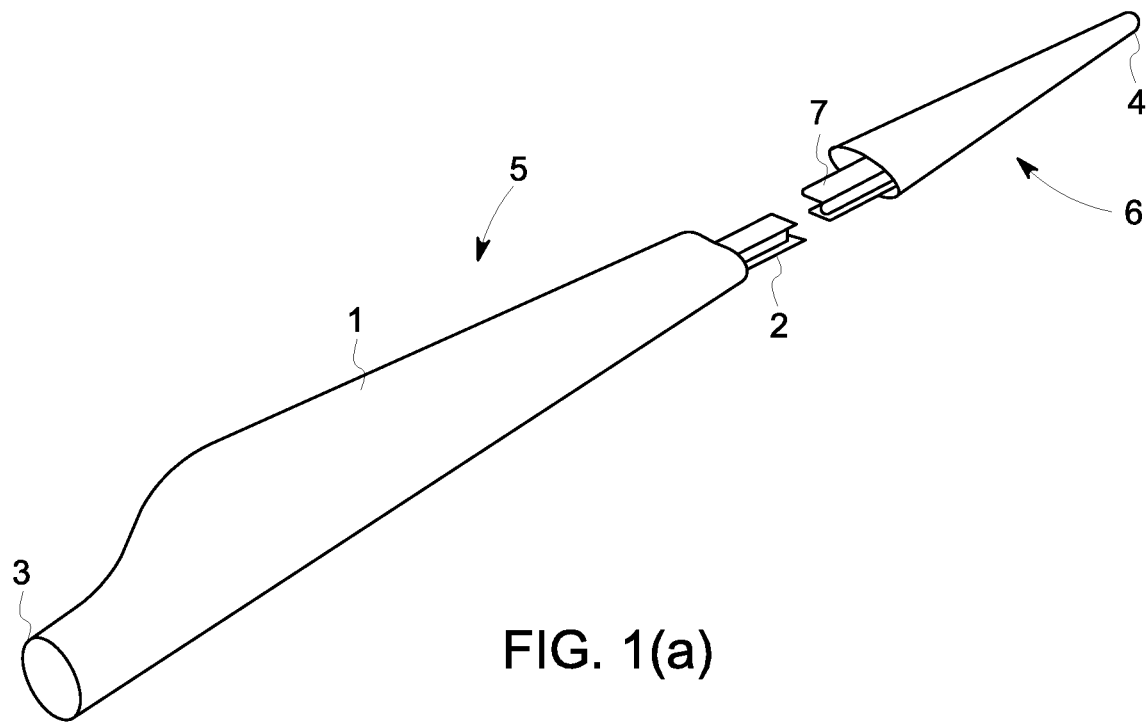
FIG. 1A is a perspective view of a blade in a partially assembled state.
Figure 1B:
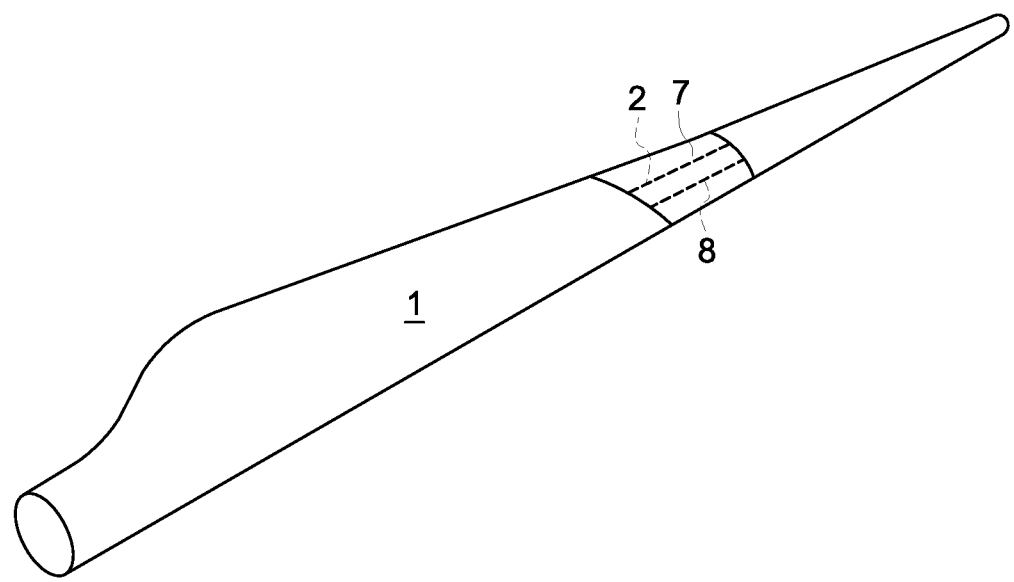
FIG. 1B is a similar view of the blade in a fully assembled state.

The overall wind turbine blade is shown in FIGS. 1A and 1B. The blade has an elongate structure extending in a radial sense in a finished wind turbine. The blade comprises a fairing that one is supported along its length by a spar extended along the full length of the fairing from the root end 3 to the tip 4. As shown in FIGS. 1*a* and 1*b* the fairing is in two parts with a main part 5 extending from the root for most the of the longitudinal length of the blade and tip section 6 forming the remainder of the blade. The main part 5 may be made of a number of sections joints end to end as described, for example in WO2009/130467.

The spar section 2 of the main part 5 connects, in use, with a tip spar section 7 for example using the technique disclosed in WO2012/004571 after which the joint region is covered by fairing panels 8.

As the blade invention is concerned with improvements in the tip section 6 and its method of manufacture, this will be described below with reference to FIGS. 2 to 6.

The tip section 6 is formed in a two part mould comprising an upper mould 10 and lower mould 11. The upper mould 10 has a mould surface 12 and the lower mould 11 has a mould surface 13. The moulds may be at least 5 meters long and more particularly at least 10 meters long. Throughout the initial layup process, the moulds are in a position shown in FIGS. 4*a* to 4*d* in that they are separated from one another with their respective mould surfaces 12, 11 facing upwardly.

Figure 4A:
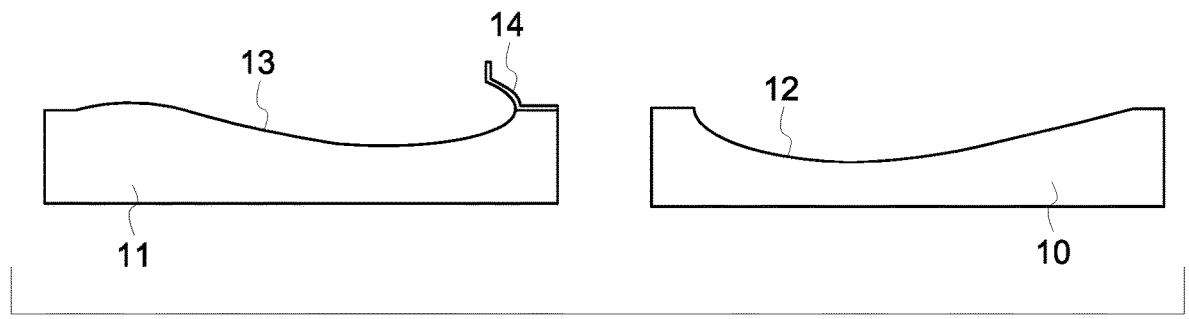
FIGS. 4A, 4B, 4C, 4D, 4E and 4F are schematic cross-sections showing the moulding process with the lower moulds being represented on the left hand side in FIGS. 4A, 4B, 4C, 4D, and 4E and the upper moulds being represented on the right hand side.

FIG. 4A shows that the lower mould 11 has an extension piece 14 which is attachable from the mould. This extends around the leading edge portion of the blade in a direction extending back towards the trailing edge. This could equally be provided on the upper mould 10.

The upper skin 15 is then laid onto the mould surface 12 of the upper mould 10 and the lower skin 16 is laid up in the lower mould 11. The lower skin is wrapped round over the lower surface of the extension piece 14. At this time, the skin material is in a semi cured form and its natural tackiness will adhere it to the extension piece 14.

Figure 4B:
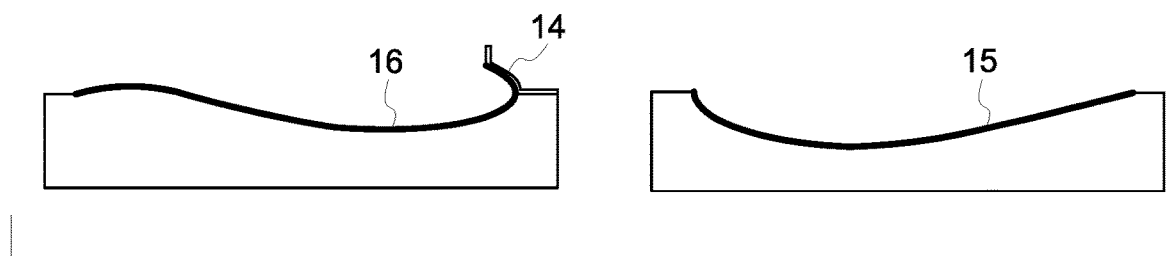
Figure 4C:
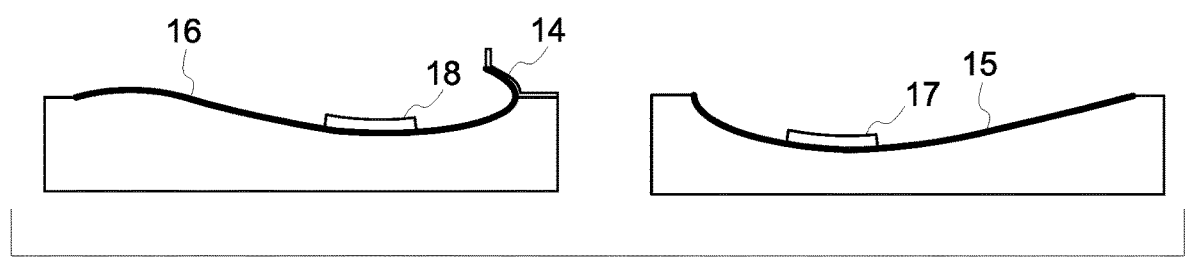
Figure 4D:
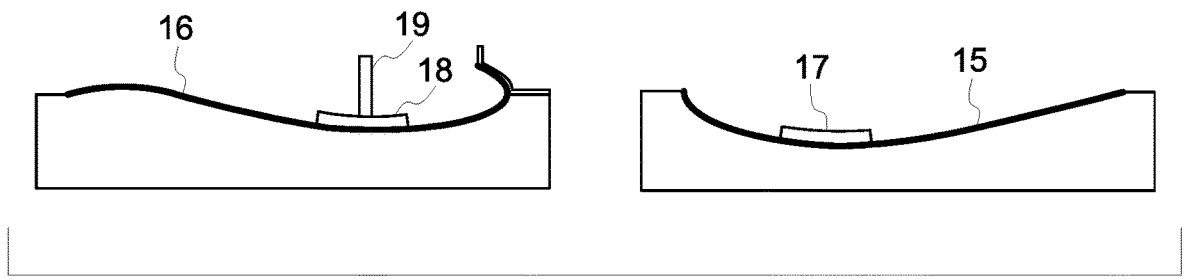
Figure 4E:
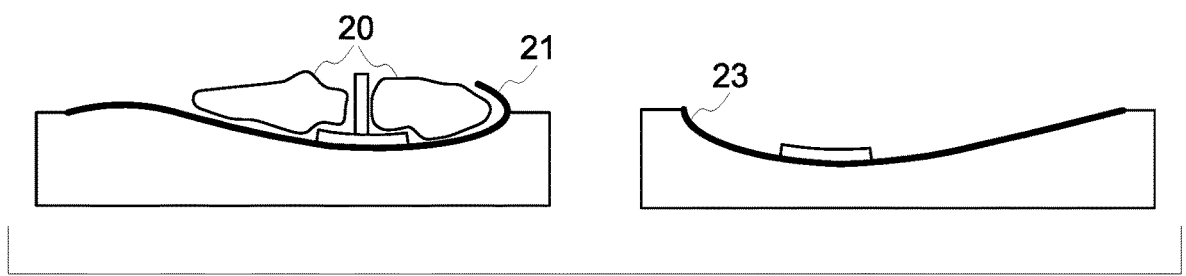

Prior to curing the fairing material, the spar caps may be formed in the tip section 6. The upper spar cap 17 is laid onto the upper skin 15 as shown in FIG. 4*b* and the lower spar cap 18 is similarly laid up on the lower skin 16. The spar cap has a longitudinal composite structure, for example as disclosed in WO2011/135306. A shear web 19 web is formed on the lower spar cap 18 but alternatively could be formed on the upper spar cap. It is, however, beneficial to form the shear web in the same mould that has the extension piece 14 and for this to be the lower mould in order to keep the upper mould as simple as possible as it is this portion which is lifted up and over the lower mould 11 as described below.

Figure 4F:
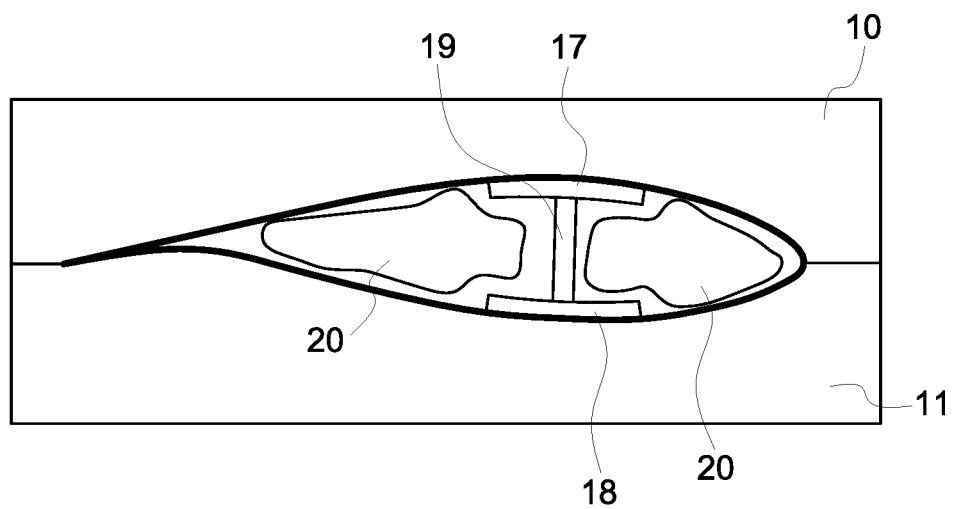

Once the shear web 19 is in place, pressure bags 20 will be placed into the lower mould 11 on either side of the shear web 19. Once in place, these can support the part of the lower skin 16 in context with the extension piece 14. The extension piece 14 can therefore be removed. With the upper 15 and the lower 16 skins in their partially cured states, the upper mould 10 is lifted up and over onto the lower mould 11 as shown in FIG. 4F. In an embodiment, the pressure bags 20 are vacuum bags, in which case the space between the pressure bags 20 and upper and lower skins is evacuated to pressurise the components to be cured. Alternatively, the pressure of bags may be positive pressure bags in which case they are pressurised, thereby inflating them to achieve the same effect.

Figure 6A:
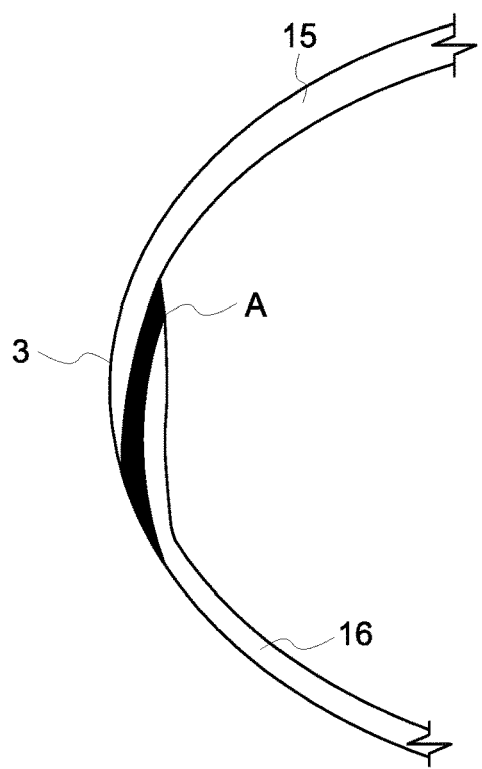
FIG. 6A is a cross-section of a joint at the leading edge in accordance with the prior art.
Figure 6B:
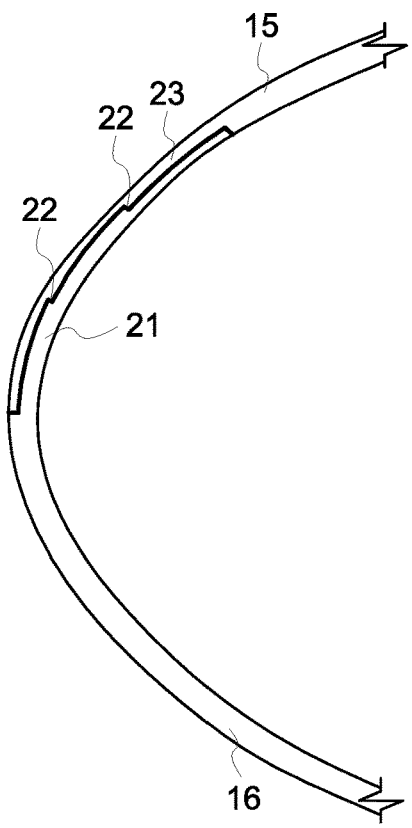
FIG. 6B is a view similar to FIG. 6A showing the same part of the blade in accordance with the invention.
Figure 7:
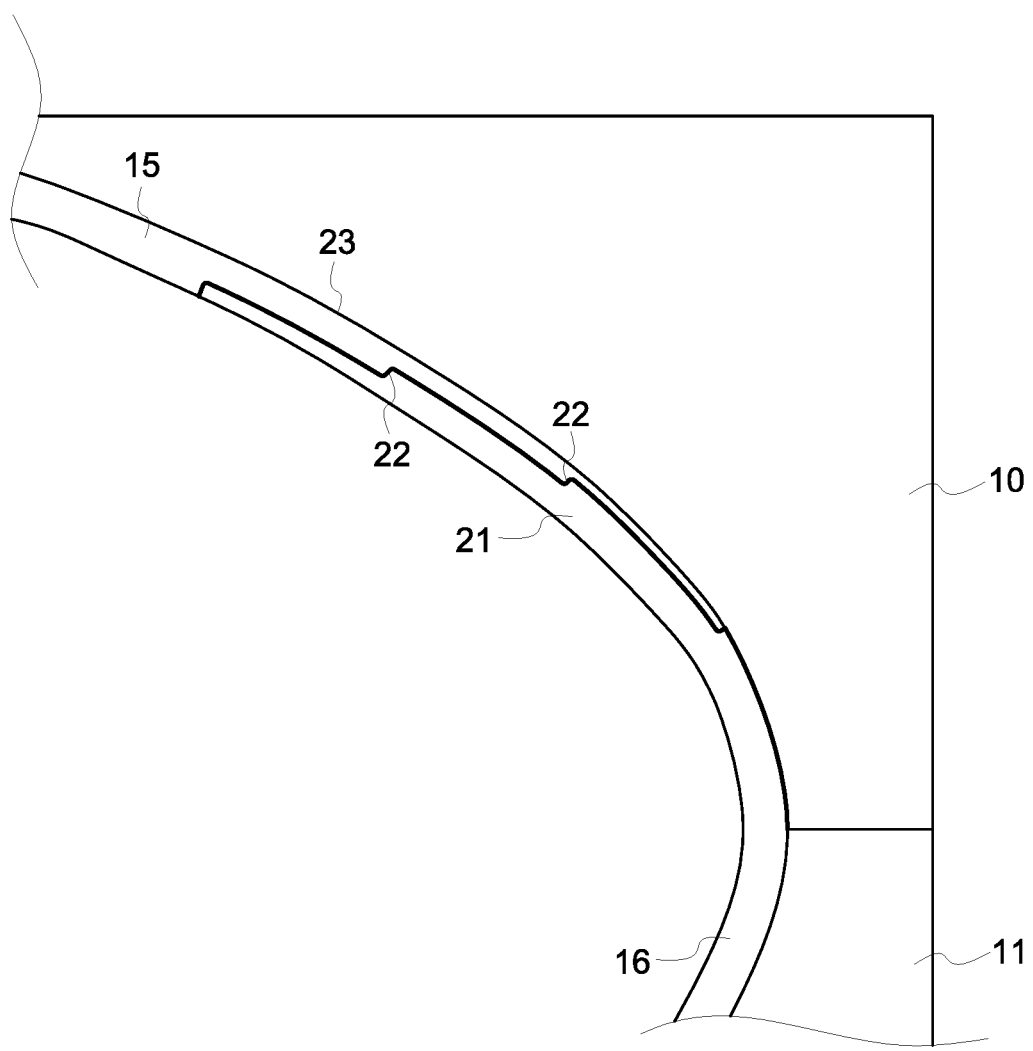
FIG. 7 is a cross-section of a detail of the two mould halves and the blade in the vicinity of a joint region.

The manner in which the two skins interact in the vicinity of the leading edge described in greater detail the reference to FIGS. 6 and 7.

As previously described, part of the lower skin 16 is initially built up along the extension piece 14. The extension piece 14 is not shown in FIG. 6B as this shows the finished joint, but it has previously been used to define the shape of the end of the lower skin as described below. As shown in FIG. 6B, the transitional region 21 is progressively stepped down by a series of transitional steps 22 from the full fairing thickness corresponding to the thickness of the lower skin 16. The internal profile of the extension piece 14 can have a complimentary stepped configuration to enable the stepped region to be precisely defined.

The material forming upper skin 15 in the vicinity of the leading edge forms a similar transitional region 23 which has a complimentary stepped configuration to that of the lower skin 16. When the two mould halves 10, 11 are bought together as shown in FIG. 7, these transitional regions 21, 23 overlap one another. This forms a large surface area in which the two halves are fused together during the co-curing process.

FIGS. 6A and 6B demonstrate the difference between the prior art (FIG. 6A) and the present invention (FIG. 6B). In the prior art the two halves are joined together by a thick layer of adhesive A. The bonding thickness of the adhesive layer, together with the significant overlap between the upper and lower skins which maintain a substantial portion of their thickness across the joint region leads to a much a thicker portion in the vicinity of the leading edge. By contrast, in the present invention, not only can the joint be achieved without an overall increase in the thickness of the fairing in the vicinity of the joint, the joint is also much stronger as it can be spread over a much wider area. If the adhesive of FIG. 6A were to be so spread, the additional mass of the leading edge would be further increased. However, as the present invention can form the joint without increasing the fairing thickness, it can be spread over as long as distance as possible without any increase in parasitic mass. Further, as the joint is caused by a fusing of the matrix material in the upper and lower skins during the curing process, the joint is highly secure.

Figure 5:
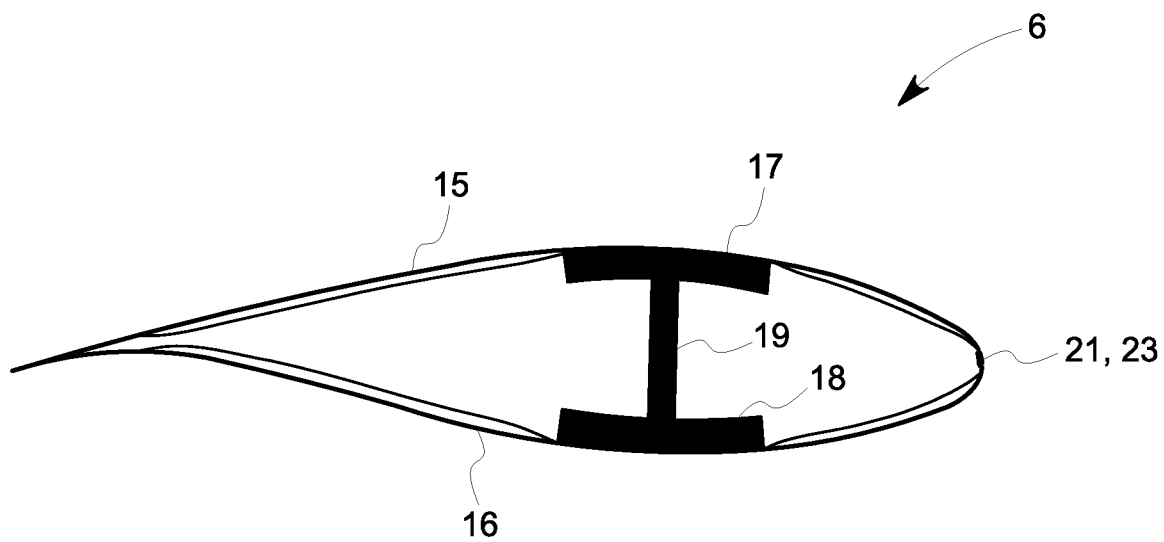
FIG. 5 is a cross-section through the finished tip.

The tip section 6 has a cross-section shown in FIG. 5 with the spar formed of the spar cap 17, lower spar cap 18 and shear web 19 are typically formed with the upper 15 and lower 16 skins with the joint between transitional regions 21, 13 in the vicinity of the leading edge.

The above described method of joining the leading edge may also be employed in a similar way in a region adjacent to the trailing edge. However, other alternatives may be contemplated as set out below.

Figure 8A:
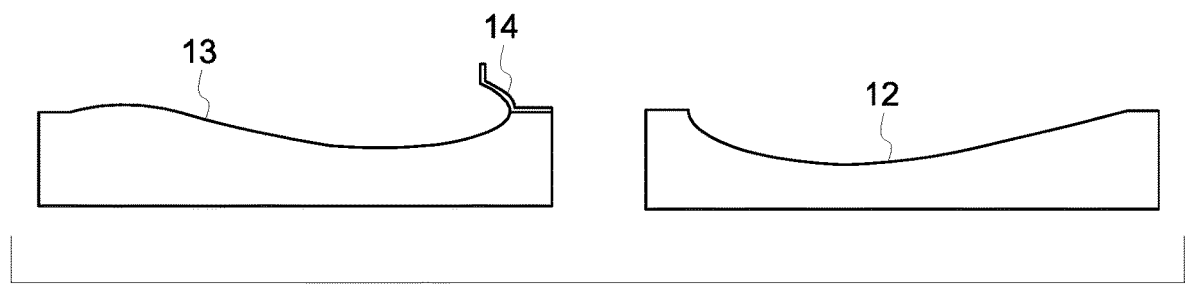
FIGS. 8A, 8B and 8C are views similar to selected views from FIGS. 4A, 4B, 4C, 4D, 4E and 4F showing a second example of a blade in the moulding process.
Figure 8B:
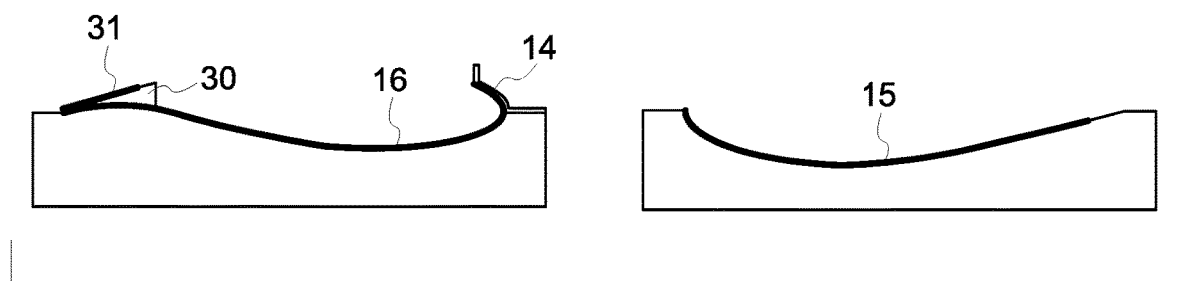
Figure 8C:
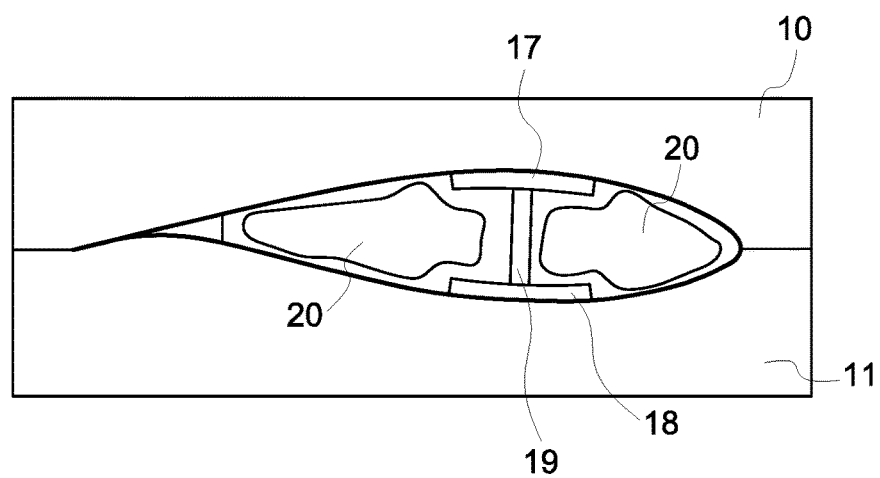
Figure 9:
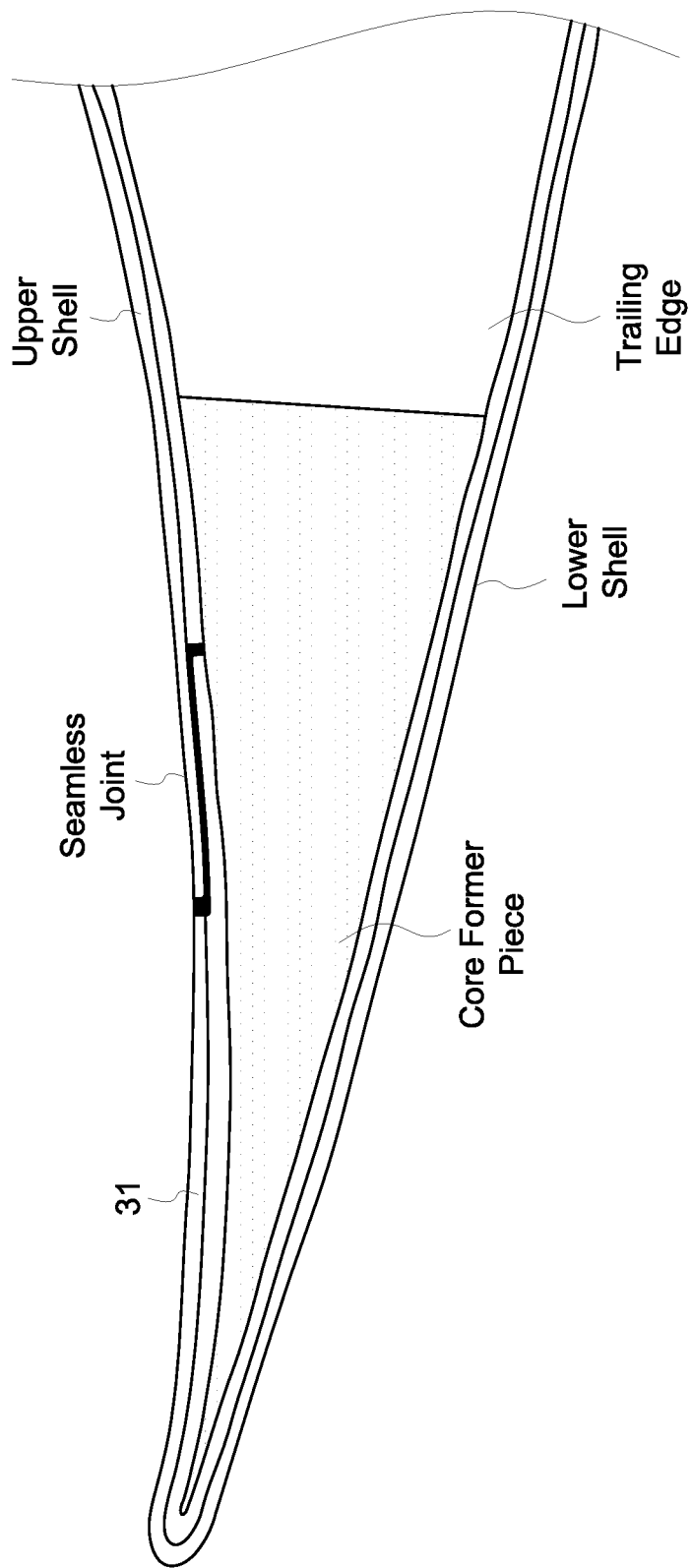
FIG. 9 is a cross-section of the detail of the trailing edge of the blade made according to the method of FIGS. 8A, 8B and 8C

FIGS. 8 and 9 show how joints can be formed at the trailing edge and in a similar manner in the above described leading edge joint. The same reference numbers have been used to designate the same the components as the previous example. The modification for this example is the provision of a tapered trailing edge core former piece 30. This is a light weight composite component for example of polyurethane or balsa which will provide some enhanced stiffness to the treading edge. This is placed on the lower skin 16 in the vicinity of the trailing edge and the lower skin material 16 is effectively folded back on itself so that it extends across part of the core former piece 30 as best shown in FIGS. 8B and 9 to form a lower trailing edge transitional region 31. The material of the upper skin 15 is correspondingly shorter (see FIG. 8B) and is provided with a stepped upper trailing edge transitional region 32 which is complimentary to the lower treading edge transitional region 31 as best shown in FIG. 9. This stepped joint provides the same benefit as described above in relation to the leading edge joint. The one difference is that the core former piece 30 is left in situ during the curing process, unlike the extension piece 14. As it is a relatively light weight component which provides some benefit for the structure and integrity of the trailing edge, it can be left in place in the finished tip section. Alternatively, it can be removed.

Figure 2:
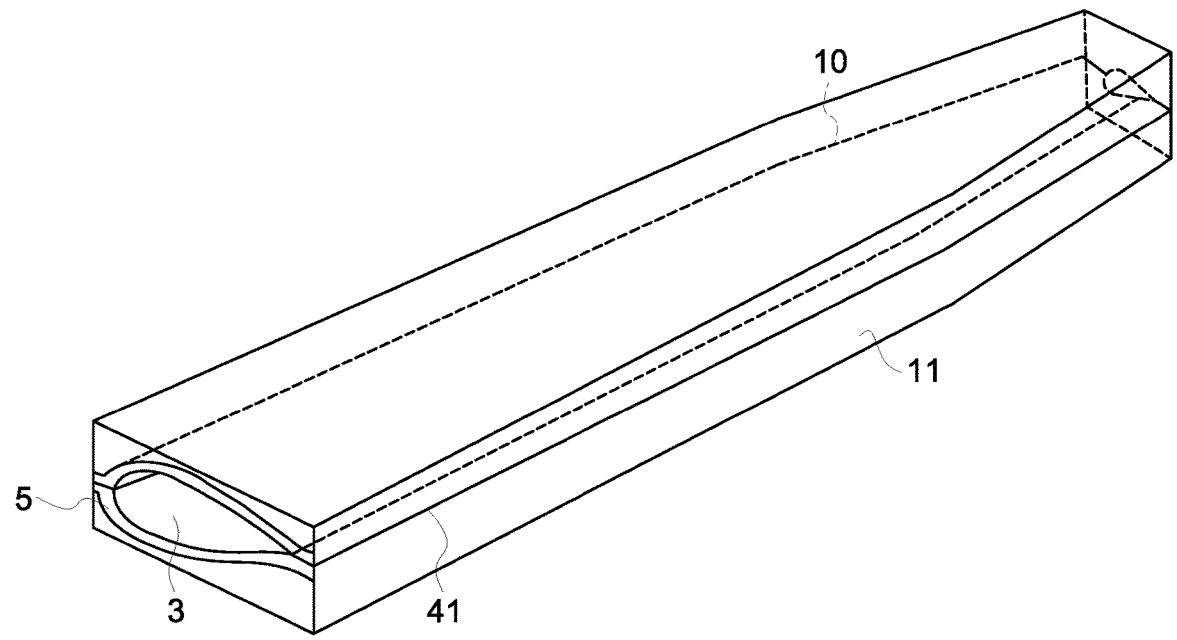
FIG. 2 is a perspective view showing the moulds that makes the blade tips.
Figure 3:
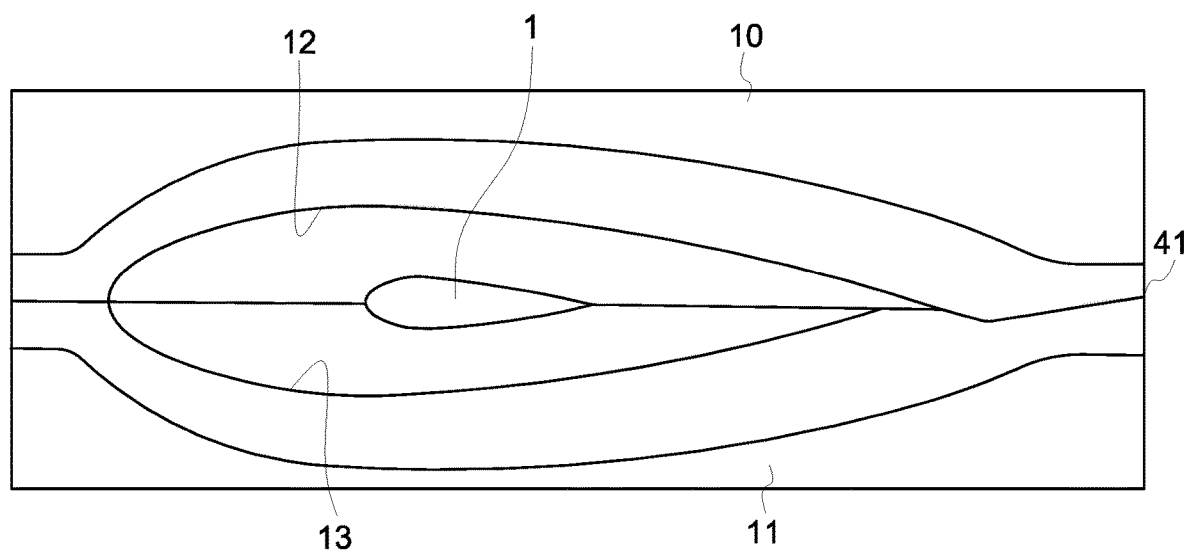
FIG. 3 is an end view of the moulds of FIG. 2.
Figure 10:
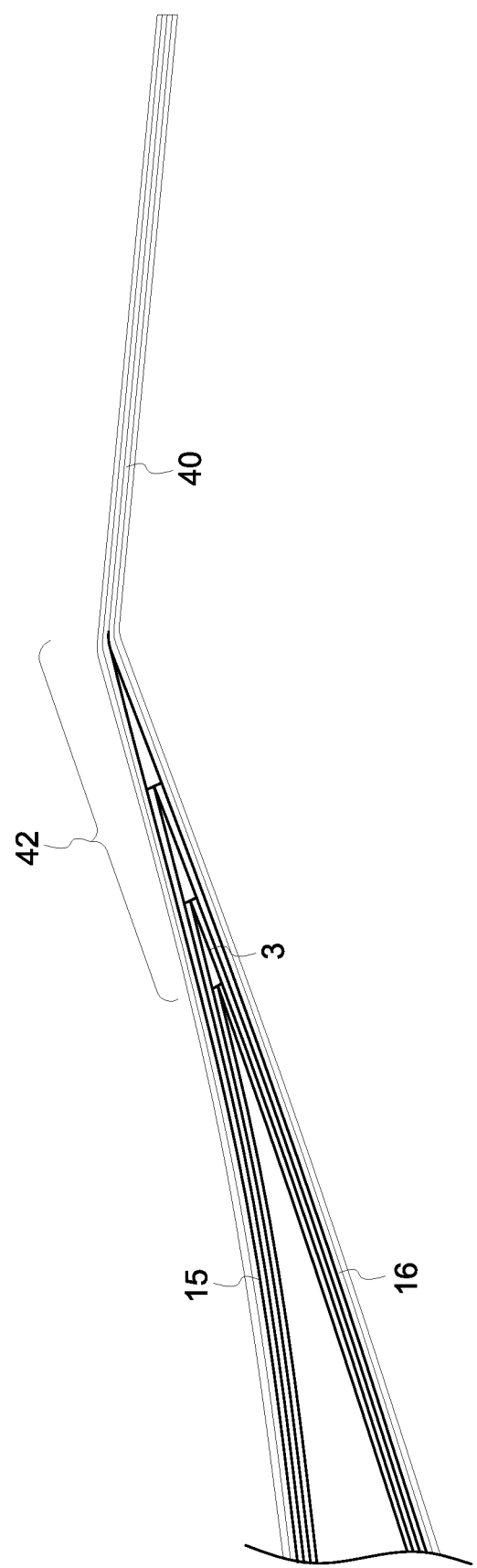
FIG. 10 is a cross-section showing a detail of the trailing edge of the blade which is an alternative to the arrangement shown in FIG. 9.

An alternative to the trailing edge configuration of FIG. 9 as shown in FIG. 10. In this arrangement, there is no core former piece 30. Instead, fibres 40 in the fairing material from both the upper skin 15 and lower skin 16 are allowed to extend out of the mould cavity and through at least a portion of the trailing edge mould seam 41 as shown in FIGS. 2 and 3. The trailing edge joint is formed in region 42 in the narrow part of the mould cavity. The protruding fibres 40 can then be trimmed from the training edge once the joint is formed. Forming the joint in this way ensures that the fibres will extend all the way to the trailing edge ensuring the structure and integrity of the training edge joint.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of moulding a wind turbine blade tip section, the method comprising:
   laying up a first composite material into a first mould half;
   laying up a second composite material into a second mould half;
   providing at least one of the first and second mould halves with an extension, the extension defining a series of transitional steps;
   laying up at least one of the first and second composite materials across the extension to form a corresponding first series of transitional steps into at least one of the first and second composite materials, wherein the other of the at least one of the first and second composite materials comprises a corresponding second series of transitional steps;

removing the extension before bringing the mould halves together;

after removal of the extension, bringing the first and second mould halves together so that the first and second composite materials overlap where the first and second mould halves meet, wherein overlapping portions of first and second composite materials comprise corresponding first and second series of transitional steps being arranged together in a stepped configuration;

supporting the overlapping portions of first and second composite materials with a pressure bag; and curing the first and second composite materials simultaneously so that matrices of the first and second composite materials fuse together where the first and second composite materials overlap.

2. The method according to claim 1, further comprising co-moulding a first spar cap in the first mould half and co-moulding a second spar cap in the second mould half.

3. The method according to claim 2, wherein the spar caps protrude from the tip section.

4. The method according to claim 1, wherein at least one pressure bag is inserted into the mould halves in order to support the first and second composite materials during the curing process.

5. The method according to claim 1, further comprising co-moulding a shear web between spar caps of the wind turbine blade tip.

6. The method according to claim 1, further comprising:

insetting a trailing edge core former piece into the mould halves; and wrapping one of the first and second composite materials across one surface of the former piece and at least partially across an opposite surface of the former piece where at least one of the first and second composite materials terminates in a transitional region; and bringing the other of the first and second composite materials into engagement with the transitional region when the mould halves are brought together.

7. The method according to claim 1, wherein the blade tip section is at least 10 meters long.

8. The method according to claim 2, wherein at least one pressure bag is inserted into the mould halves in order to support the first and second composite materials during the curing process.

9. The method according to claim 3, wherein at least one pressure bag is inserted into the mould halves in order to support the first and second composite materials during the curing process.

* * * * *